United States Patent
Pedicini et al.

(10) Patent No.: US 12,465,372 B1
(45) Date of Patent: Nov. 11, 2025

(54) ORTHOPEDIC ROTARY TOOL

(71) Applicant: Fidelis Partners, LLC, Cheyenne, WY (US)

(72) Inventors: Christopher Pedicini, Brentwood, TN (US); Joshua Pedicini, Nashville, TN (US)

(73) Assignee: FIDELIS PARTNERS, LLC, Cheyenne, WY (US)

( * ) Notice: Subject to any disclaimer, the term of this patent is extended or adjusted under 35 U.S.C. 154(b) by 0 days.

(21) Appl. No.: 19/201,510

(22) Filed: May 7, 2025

Related U.S. Application Data (60) Provisional application No. 63/643,614, filed on May 7, 2024.

(51) Int. Cl.
*A61B 17/16* (2006.01)

(52) U.S. Cl.
CPC ...... *A61B 17/1624* (2013.01); *A61B 17/1626* (2013.01)

(58) Field of Classification Search
CPC . A61B 17/16; A61B 17/1613; A61B 17/1615; A61B 17/1617; A61B 17/162; A61B 17/1622; A61B 17/1624; A61B 17/1626; A61B 17/1628; A61B 17/1631; A61B 17/1633; A61B 17/1635; A61B 17/1637; A61B 17/164; A61B 17/1642; A61B 17/1655; A61B 17/1657; A61B 17/1695; A61B 17/1697; B25F 5/001
See application file for complete search history.

(56) References Cited

U.S. PATENT DOCUMENTS

| | | | |
|---|---|---|---|
| 12,090,620 B2 * | 9/2024 | Pedicini | A61B 17/1631 |
| 12,257,688 B2 * | 3/2025 | Pedicini | A61B 17/1628 |
| 2004/0211573 A1 * | 10/2004 | Carrier | B25F 5/00 173/183 |
| 2006/0081386 A1 * | 4/2006 | Zhang | B25B 21/00 173/2 |
| 2008/0011102 A1 * | 1/2008 | Schell | B25F 5/001 73/862.22 |
| 2008/0099217 A1 * | 5/2008 | Seith | B25B 21/026 173/1 |
| 2024/0188984 A1 * | 6/2024 | Pedicini | A61B 17/320758 |
| 2024/0189975 A1 * | 6/2024 | Pedicini | B25F 5/001 |

* cited by examiner

*Primary Examiner* — Eric S Gibson
(74) *Attorney, Agent, or Firm* — XSENSUS LLP (57) ABSTRACT

An orthopedic rotary tool may include a drive system including a first rotary component and a second rotary component, an energy storage element, an actuator system including a first actuator element disposed on the first rotary component and a second actuator element disposed on the second rotary component, a coupling mechanism, and an output element. The coupling mechanism may be operable between coupled states and decoupled states. During operation, the energy storage element may accumulate rotational energy via the drive system and relative rotation between the first rotary component and the second rotary component may cause interactions between the first actuator element and the second actuator element. The interactions may transition the coupling mechanism between the coupled states and the decoupled states. When the coupling mechanism is in the coupled states, the energy storage element may be configured to deliver a torque impulse to the output element.

20 Claims, 4 Drawing Sheets

ORTHOPEDIC ROTARY TOOL

CROSS-REFERENCE TO RELATED APPLICATION

This application claims the benefit of U.S. Provisional Application No. 63/643,614, filed May 7, 2024, which is incorporated herein by reference in its entirety.

BACKGROUND

Orthopedic rotary tools are used in orthopedic procedures, such as joint replacement, fracture fixation, and spinal fusion procedures. For example, the orthopedic rotary tools may be used for precise cutting, drilling, and/or shaping of bone during the orthopedic procedures.

SUMMARY

Some implementations described herein relate to an orthopedic rotary tool, comprising: an energy storage element configured to accumulate rotational energy; a drive system including a first rotary component and a second rotary component, wherein the first rotary component is configured to impart rotation to the energy storage element; an actuator system including at least a first actuator element disposed on the first rotary component and a second actuator element disposed on the second rotary component; a coupling mechanism operable between coupled states and decoupled states; and an output element; wherein, during operation of the orthopedic rotary tool: the energy storage element accumulates the rotational energy via the drive system, relative rotation between the first rotary component and the second rotary component causes interactions between the first actuator element and the second actuator element, the interactions transitioning the coupling mechanism between the coupled states and the decoupled states, and when the coupling mechanism is in the coupled states, the energy storage element is configured to deliver a torque impulse to the output element.

Some implementations described herein relate to an orthopedic rotary tool, comprising: an energy storage element configured to accumulate rotational energy; a drive system including rotary components; an actuator system including actuator elements, wherein at least one actuator element is disposed on the rotary component; an output element; and a coupling mechanism configured to selectively engage the energy storage element with the output element, wherein the coupling mechanism is configured to be actuated and de-actuated based on at least one of physical interactions or non-physical interactions between the at least one actuator element and at least one different actuator element based on rotation of the rotary component, and wherein actuation of the coupling mechanism causes: engagement of the energy storage element with the output element to deliver a torque impulse to the output element, and disengagement of the energy storage element from the drive system to limit reactionary torque.

Some implementations described herein relate to an orthopedic rotary tool, comprising: an energy storage element configured to accumulate rotational energy; an actuator system including actuator elements; a coupling mechanism operable between a coupled state and a decoupled state; an output element; and a drive system configured to: impart rotation to the energy storage element, and cause rotational movement of at least one actuator element resulting in an interaction between the at least one actuator element and a different actuator element, wherein the interaction causes the coupling mechanism to transition between the coupled state and the decoupled state, and in the coupled state, the coupling mechanism enables the energy storage element to deliver a torque impulse to the output element.

DETAILED DESCRIPTION

The following detailed description of example implementations refers to the accompanying drawings. The same reference numbers in different drawings may identify the same or similar elements.

An orthopedic rotary tool (e.g., a reamer, a drill, among other examples) may be used (e.g., by an operator, a surgeon, and/or a robot, among other examples) to perform one or more orthopedic techniques during an orthopedic procedure. For example, the operator may use the orthopedic rotary tool to cut, drill, and/or shape bone during the orthopedic procedure.

To cut, drill, and/or shape the bone during the orthopedic procedure, the operator may cause a component (e.g., edges or cutting flutes of a reamer, among other examples) of the orthopedic rotary tool to rotate and interact with the bone. As an example, the orthopedic rotary tool may include a motor to provide a rotational force that causes the component to rotate. As the component rotates, the operator causes the component to interact with the bone, and the rotational motion, combined with the component, creates a cutting action that removes bone material.

However, during the cutting process, the interaction between the component and the bone generates a reactionary torque (e.g., a reactionary force that opposes rotation of the component). In some cases, a high reactionary torque may be generated which requires the operator of the orthopedic rotary tool to exert a high counteracting force from his wrist to overcome the high reactionary torque and maintain control over movement associated with the orthopedic rotary tool. If the surgeon has to overcome high reactionary torque during orthopedic procedures, this introduces drawbacks and challenges. These include operator fatigue, wrist injury and reduced cutting precision of the orthopedic implement potentially resulting in suboptimal implant positioning and stability. Furthermore, typical techniques employed to mitigate high reactionary torque generate excessive noise levels, which can lead to hearing damage of the operator.

In the case of reaming an acetabulum, as is required in total hip arthroplasty (THA), a drawback of typical orthopedic rotary tools is the force required from the surgeon to advance the reamer medially. For example, typical orthopedic rotary tools (e.g., typical reamers) require an application (e.g., by a surgeon) of at least approximately 20 pounds (lbs) of force for medial advancement, and, in some cases, such as reaming through hard bone, up to at least approximately 80 lbs of force. This contributes to increased surgeon fatigue, increased risk of injuries (e.g., to a wrist of the surgeon), and reduced cutting precision (e.g., during orthopedic procedures) potentially resulting in suboptimal implant positioning and stability.

Figure 1A:
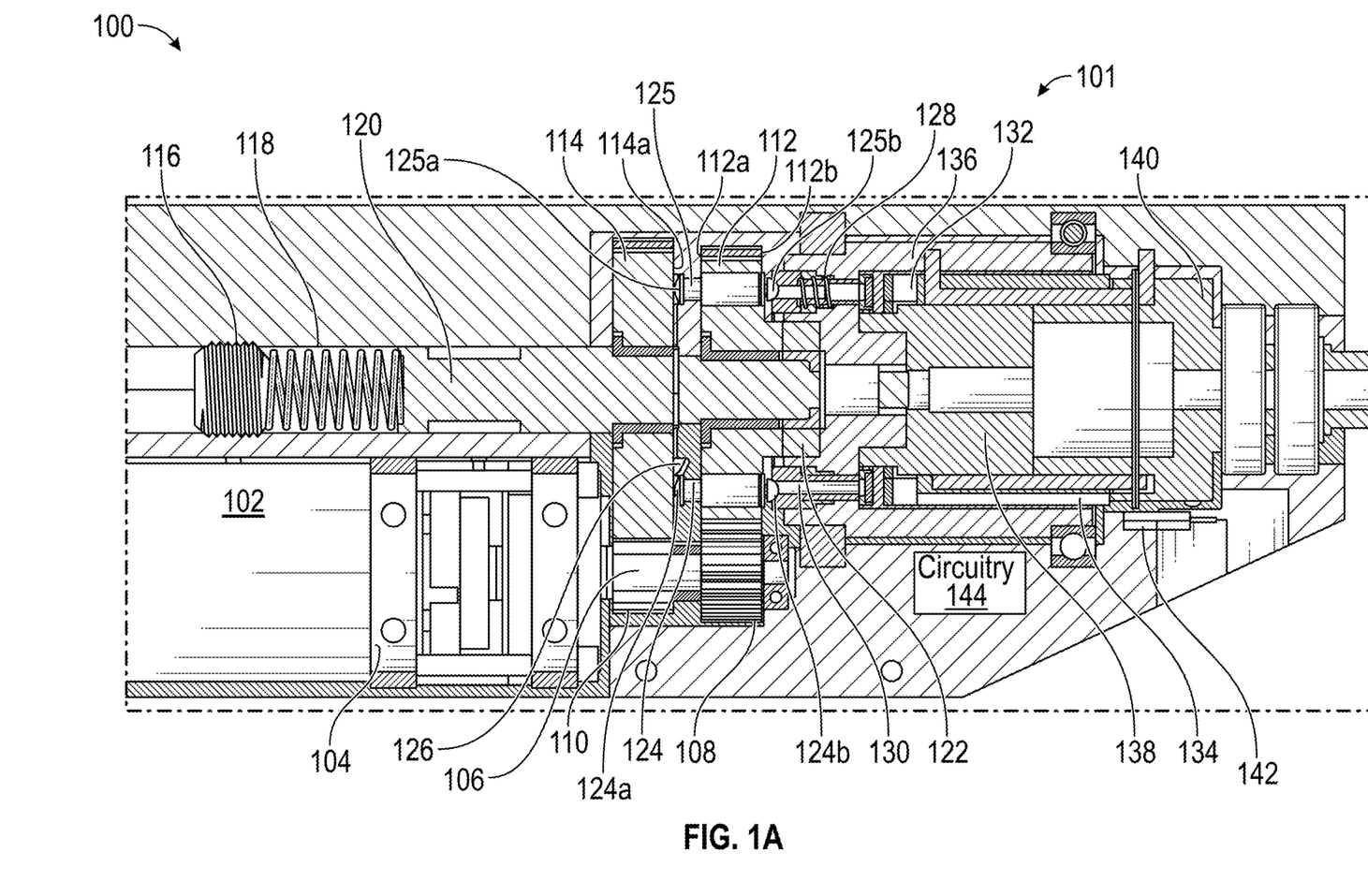
FIGS. 1A-1C are diagrams of an example associated with transmitting torque impulses via an orthopedic rotary tool.
Figure 1B:
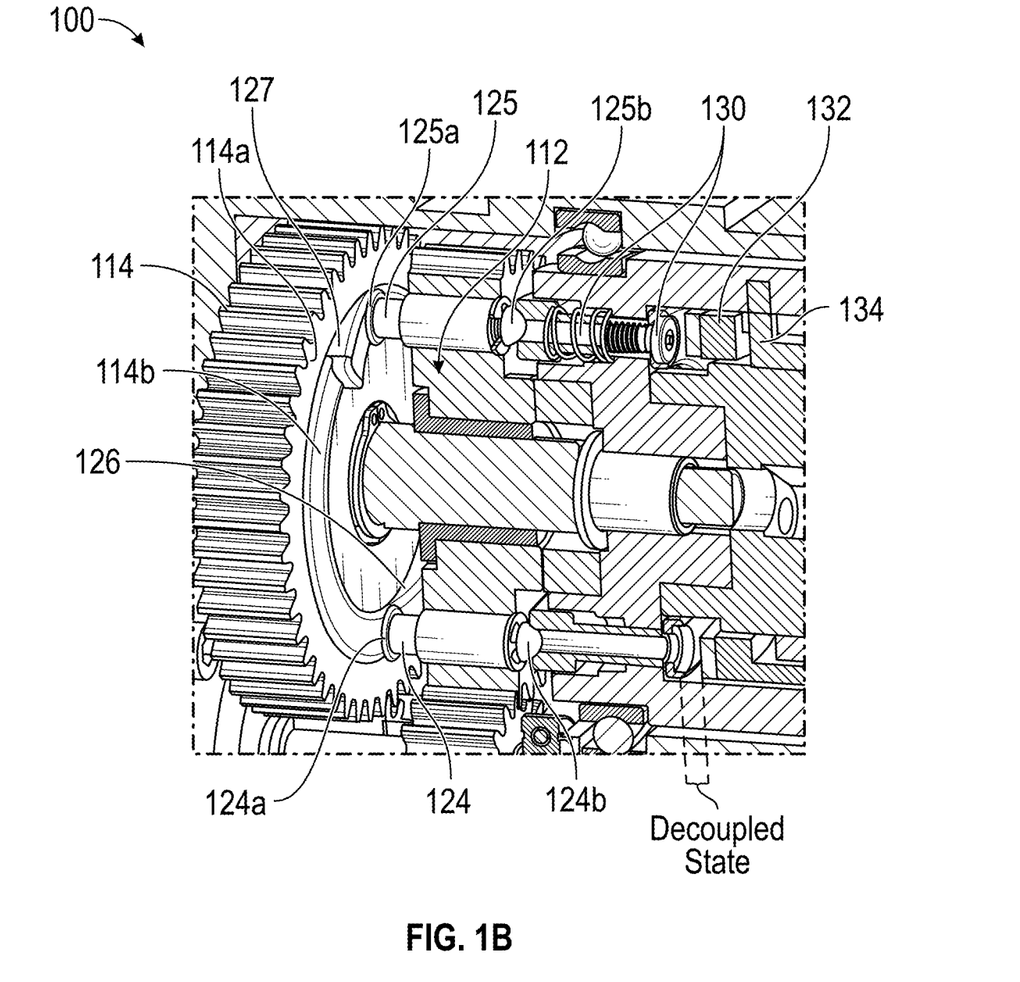
Figure 1C:
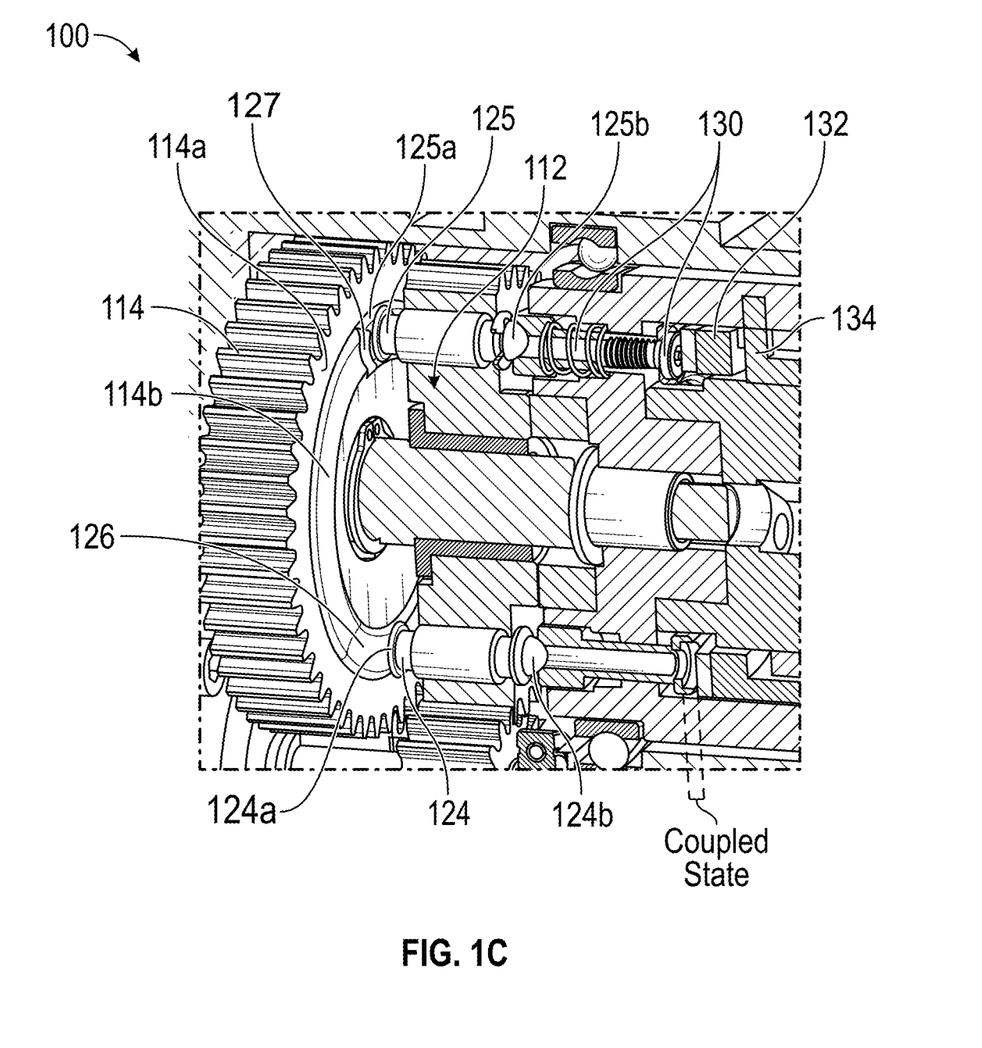

FIGS. 1A-1C are diagrams of an example 100 associated with transmitting torque impulses (e.g., rotational torque impulses) via an orthopedic rotary tool (e.g., shown as an orthopedic rotary tool 101). As shown in FIG. 1A, the orthopedic rotary tool 101 may include a drive system (e.g., shown as including a motor 102, a gearbox 104, a drive shaft 106, a first drive gear 108, a second drive gear 110, a first driven gear 112 including a first surface 112a and a second surface 112b, a second driven gear 114 including a first surface 114a), an actuator assembly (e.g., shown as including a set screw 116, a spring 118, a guide shaft 120), an interface element (e.g., shown as a friction disk 122), an actuator system including actuator elements (e.g., shown as a first actuator pin 124 including a first end 124a and a second end 124b, a second actuator pin 125 including a first end 125a and a second end 125b, a first ramp 126, a second ramp 127, a coupling mechanism (e.g., shown as a wrap spring assembly including a wrap spring trigger return spring 128, a wrap spring trigger 130, a wrap spring clip 132, and a wrap spring 134), an energy storage element (e.g., shown as including a flywheel 136 and a flywheel hub 138, an output element (e.g., shown as an output anvil 140), a sensor 142, and circuitry 144.

As further shown in FIG. 1A, the motor 102 may be operatively coupled to the drive shaft 106 (e.g., via the gearbox 104). The drive shaft 106 may be operatively coupled to the first drive gear 108 and the second drive gear 110. The first drive gear 108 may be operatively coupled to the first driven gear 112. The second drive gear 110 may be operatively coupled to the second driven gear 114.

The motor 102 may generate rotational motion and transmit the rotational motion to the gearbox 104. The gearbox 104 may transmit the rotational motion to the drive shaft 106 causing the drive shaft 106 to rotate. In some implementations, the gearbox 104 may transmit the rotational motion to the drive shaft 106 at a gear ratio (e.g., which may or may not affect at least one of a rotational speed or a torque of the rotational motion).

Although the motor 102 is described as transmitting the rotational motion to the drive shaft 106 via the gearbox 104, the motor 102 may transmit the rotational motion to the drive shaft 106 in any suitable manner, such as via a direct coupling between the motor 102 and the drive shaft 106, among other examples.

The drive shaft 106 may transmit the rotational motion to the first drive gear 108 and the second drive gear 110 causing the first drive gear 108 and the second drive gear 110 to rotate. The first drive gear 108 may transmit the rotational motion to the first driven gear 112 causing the first driven gear 112 to rotate. The second drive gear 110 may transmit the rotational motion to the second driven gear 114 causing the second driven gear 114 to rotate.

In some implementations, the first driven gear 112 and the second driven gear 114 may be configured to rotate at different rotational speeds. For example, a difference in the different rotational speeds may be at least sufficient to cause periodic alignment of the first actuator pin 124 and the first ramp 126 and periodic alignment of the second actuator pin 125 and the second ramp 127, as described in more detail elsewhere herein.

In some implementations, a rotational speed of the first driven gear 112 may be based on first gear ratio between the first drive gear 108 and the first driven gear 112 and a rotational speed of the second driven gear 114 may be based on a second gear ratio between the second drive gear 110 and the second driven gear 114, which may be different from the first gear ratio. For example, the rotational speed of the first driven gear 112 may differ from the rotational speed of the second driven gear 114 by at least approximately 5% (e.g., the rotational speed of the first driven gear 112 may be at least approximately 5% higher than the rotational speed of the second driven gear 114, among other examples). Although the rotational speed of the first driven gear 112 is described as differing from the rotational speed of the second driven gear 114 by at least approximately 5%, the rotational speed of the first driven gear 112 may differ from the rotational speed of the second driven gear 114 by any suitable difference.

As further shown in FIG. 1A, the set screw 116 may be operatively coupled to the spring 118. The spring 118 may be operatively coupled to the guide shaft 120. The friction disk 122 may be provided between the first driven gear 112 and the flywheel 136.

In some implementations, the set screw 116, the spring 118, and the guide shaft 120 may form the actuator assembly, which may also be referred to herein as a normal force actuator assembly, that is operable in a first state and a second state, as described in more detail elsewhere herein. When the actuator assembly operates in the first state, the actuator assembly may be configured to transmit a normal force that causes coupling among the first driven gear 112, the friction disk 122, and the flywheel 136 to enable the flywheel 136 to be driven. In other words, and when operating in the first state, the set screw 116, the spring 118, and the guide shaft 120 may be configured to transmit the normal force to the first driven gear 112, which causes the first driven gear 112 to engage the friction disk 122. Engagement of the friction disk 122 may cause the friction disk 122 to couple to the flywheel 136 (e.g., which enables the first driven gear 112 to drive the flywheel 136).

Accordingly, contact between the first driven gear 112 and the friction disk 122 may create a first friction interface and contact between the friction disk 122 and the flywheel 136 may create a second friction interface. In some implementations, the friction disk 122 may be composed of one or more polymeric materials, elastomers, and/or metal composites (e.g., to provide the first friction interface and the second friction interface). For example, the friction disk 122 may be composed of silicone rubber, urethane, and/or sintered metal materials, among other examples.

When the actuator assembly operates in the second state, the actuator assembly may be configured to refrain from transmitting the normal force that causes coupling among the first driven gear 112, the friction disk 122, and the flywheel 136 to prevent the flywheel 136 from being driven. In other words, and when operating in the second state, the set screw 116, the spring 118, and the guide shaft 120 may be configured to disallow the coupling among the first driven gear 112, the friction disk 122, and the flywheel 136 to prevent the friction disk 122 from driving the flywheel 136.

Although the friction disk 122 is described as being positioned between the first driven gear 112 and the flywheel 136, the friction disk 122 may be positioned in any suitable manner, such as being fixedly coupled to the first driven gear 112, fixedly coupled to the flywheel 136, or otherwise positioned between the first driven gear 112 and the flywheel 136 (e.g., providing coupling of the rotational motion via a single friction interface, among other examples).

In some implementations, the friction disk 122 may limit reactionary torque (e.g., an opposing force or rotational resistance exerted in an opposite direction to a rotational direction of the output anvil 140). For example, the friction disk 122 may slip (e.g., the friction disk 122 may rotate relative to a friction interface), such as when a torque experienced by the friction disk 122 (e.g., a torque based on a load) exceeds a threshold (e.g., a torque threshold between approximately 5 inch-pounds (in-lbs) and 25 in-lbs, among other examples). In other words, the friction disk 122 may be configured to decouple the first driven gear 112 from the flywheel 136 upon reaching a torque threshold.

As a result, the reactionary torque is limited to the slip torque of the friction disk 122. In this way, a user of the orthopedic rotary tool 101 does not experience reactionary torque higher than the slip torque of the friction disk 122. Although the torque threshold is described as being between approximately 5 inch-pounds (in-lbs) and 25 in-lbs, the torque threshold may be associated with any suitable slip torque values.

Accordingly, and in some implementations, the rotational motion of the first driven gear 112 may be transmitted to the flywheel 136 through the friction disk 122 (e.g., via one or more friction interfaces) causing the flywheel 136 to rotate (e.g., accelerate), which enables the flywheel 136 to store rotational kinetic energy. In some implementations, the flywheel 136 may be driven to a desired speed (e.g., based on the second gear ratio, among other examples). For example, the flywheel 136 may be driven to a desired speed from approximately 1010 revolutions per minute (rpm) to 5,000 rpm, among other examples.

Although the flywheel 136 is described herein as being driven to a desired speed from approximately 1000 rpm to 5,000 rpm, the flywheel 136 may be driven to any suitable speed. Additionally, and although the flywheel 136 is described as being driven by the first driven gear 112 (e.g., through the friction disk 122), the flywheel 136 may be driven by any suitable rotary transmission assembly and/or any suitable rotary component, such as being driven by the second driven gear 114, among other examples.

In some implementations, the first actuator pin 124 and the second actuator pin 125 may be provided on the first driven gear 112. For example, and as shown in FIGS. 1B-1C, the first actuator pin 124 and the second actuator pin 125 may be coupled to the first driven gear 112 with the first ends 124a and 125a extending through the first surface 112a of the first driven gear 112 and with the second ends 124b and 125b extending through the second surface 112b of the first driven gear 112. As a result, rotation of the first driven gear 112 may cause rotation of the first actuator pin 124 and the second actuator pin 125 (e.g., the first actuator pin 124 and the second actuator pin 125 may rotate with the first driven gear 112 along a rotational path).

In some implementations, the first actuator pin 124 and the second actuator pin 125 may be movable between de-actuated positions and actuated positions. Movement of the first actuator pin 124 and the second actuator pin 125 from the de-actuated positions to the actuated positions may cause actuation of the wrap spring assembly, and movement of the first actuator pin 124 and the second actuator pin 125 from the actuated positions to the de-actuated positions may cause de-actuation of the wrap spring assembly, as described in more detail elsewhere herein.

In some implementations, the first actuator pin 124 and the second actuator pin 125 may be biased into the de-actuated positions, such as by a biasing element. For example, the wrap spring trigger return spring 128 may be configured to bias the first actuator pin 124 and the second actuator pin 125 in the de-actuated states.

In some implementations, the first ramp 126 and the second ramp 127 may be provided on the second driven gear 114. For example, and as shown in FIGS. 1B-1C, the first ramp 126 and the second ramp 127 may be provided on the first surface 114a of the second driven gear 114 (e.g., the first ramp 126 and the second ramp 127 may be inserts fixedly coupled to the first surface 114a). As a result, rotation of the second driven gear 114 may cause rotation of the first ramp 126 and the second ramp 127 (e.g., the first ramp 126 and the second ramp 127 may rotate along a rotational path).

In some implementations, the rotational paths of the first actuator pin 124, the second actuator pin 125, the first ramp 126, and the second ramp 127 may be aligned. Accordingly, for example, relative rotation between the first driven gear 112 and the second driven gear 114 (e.g., where the rotational speed of the first driven gear 112 may be higher relative to the rotational speed of the second driven gear 114) may cause interactions (e.g., physical interactions, non-physical interactions, and/or cyclic interactions) between the first actuator pin 124 and the first ramp 126 and between the second actuator pin 125 and the second ramp 127, as described in more detail elsewhere herein.

As shown in FIGS. 1B-1C, the first end 124a of the first actuator pin 124 and the first end 125a of the second actuator pin 125 may move along (or in proximity to) a path 114b provided on the first surface 114a of the second driven gear 114. The first end 124a of the first actuator pin 124 may interact with the first ramp 126 and the first end 125a of the second actuator pin 125 may interact with the second ramp 127, as described in more detail elsewhere herein.

In some implementations, the interactions (e.g., between the first end 124a of the first actuator pin 124 and the first ramp 126 and between the first end 125a of the second actuator pin 125 and the second ramp 127) may cause actuations and de-actuations of the wrap spring assembly (e.g., the wrap spring 134). For example, the wrap spring assembly may be operable between a decoupled state (or a disengaged state) and a coupled state (or an engaged state). When the wrap spring assembly is in the decoupled state, the wrap spring assembly may be configured to refrain from coupling the flywheel 136 to the output anvil 140. When the wrap spring assembly is in the coupled state, the wrap spring assembly may be configured to couple the flywheel 136 to the output anvil 140.

In other words, relative rotation between the first driven gear 112 and the second driven gear 114 may cause interactions between the first actuator pin 124 and the first ramp 126 and between the second actuator pin 125 and the second ramp 127. The interactions may transition the wrap spring assembly between coupled states and decoupled states. When the wrap spring assembly is in the coupled states, the flywheel 136 may be in communication (e.g., mechanical communication) with the output anvil 140 (e.g., via the flywheel hub 138) and configured to deliver a torque impulse to the output anvil 140.

As shown in FIG. 1B, and for example, the wrap spring 134 may be in the decoupled state (e.g., an initial state of the wrap spring 134 may be a decoupled state). As the first driven gear 112 and the second driven gear 114 rotate, the first end 124a of the first actuator pin 124 moves along the first ramp 126 (e.g., the first end 124a travels at an angle along the first ramp 126) and the first end 125a of the second actuator pin 125 moves along the second ramp 127 (e.g., the first end 125a travels at an angle along the second ramp 127).

This causes the first actuator pin 124 and the second actuator pin 125 to move from the de-actuated positions to the actuated positions (e.g., traveling along the first ramp 126 causes the first actuator pin 124 to move axially in a linear direction toward the wrap spring trigger 130 and traveling along the second ramp 127 causes the second actuator pin 125 to move axially in a linear direction toward the wrap spring trigger 130). The second end 124b of the first actuator pin 124 and the second end 125b of the second actuator pin 125 interact with the wrap spring trigger 130 (e.g., the second end 124b of the first actuator pin 124 and the second end 125b of the second actuator pin 125 push into the wrap spring trigger 130 causing actuation of the wrap spring trigger 130).

In some implementations, actuation of the wrap spring trigger 130 causes the wrap spring trigger 130 to interact with the wrap spring clip 132 (e.g., which may initially be non-rotating). The interaction between the wrap spring trigger 130 and the wrap spring clip 132 may cause the wrap spring clip 132 to rotate with the wrap spring trigger 130 (e.g., for a time period). For example, surfaces in contact between the wrap spring trigger 130 and the wrap spring clip 132 may include materials (e.g., one or more polymeric materials, elastomers, and/or metal composites, among other examples) configured to provide a frictional interface, enabling the wrap spring clip 132 to rotate with the wrap spring trigger 130 for the time period.

In some implementations, rotation of the wrap spring clip 132 may cause the wrap spring 134 to couple the flywheel 136 to the output anvil 140. For example, rotation of the wrap spring clip 132 may cause the wrap spring 134 to wrap down on the flywheel hub 138, which couples the flywheel 136 to the output anvil 140 (e.g., because the flywheel 136 is fixedly coupled to the flywheel hub 138). This causes the flywheel 136 to transmit a torque impulse to the output anvil 140 (e.g., based on being coupled to the output anvil 140). The torque impulse may cause the output anvil 140 to rotate, as described in more detail elsewhere herein.

In some implementations, the torque impulse may be based on rotational energy associated with one or more components of the orthopedic rotary tool 101. For example, the torque impulse may be based on rotational energy accumulated and/or stored by the first driven gear 112 and/or the flywheel 136, among other examples. In other words, the flywheel 136 may be configured to transmit torque impulses to the output anvil 140 based on rotational energy accumulated and/or stored by any suitable component of the orthopedic rotary tool 101.

In some implementations, and as the first actuator pin 124 moves along the first ramp 126, and as the first end 125a of the second actuator pin 125 moves along the second ramp 127, the first actuator pin 124 and the second actuator pin 125 may transmit an opposing force to the normal force (e.g., provided by the actuator assembly). For example, the first actuator pin 124 and the second actuator pin 125 may transmit the opposing force to the second driven gear 114, which causes one or more components of the actuator assembly to move in a direction of the opposing force (e.g., the guide shaft 120 may move in a direction of the opposing force by compressing the spring 118, among other examples).

This movement in the direction of the opposing force causes the first driven gear 112 to be decoupled from flywheel 136 while the flywheel 136 is coupled to the output anvil 140 (e.g., because the normal force is no longer causing coupling among the first driven gear 112, the friction disk 122, and the flywheel 136). In other words, the first ramp 126 and the second ramp 127 may be configured to allow the actuator assembly to physically separate the first driven gear 112 from the flywheel 136.

For example, a length of the first ramp 126 and the second ramp 127 may be configured to cause the first actuator pin 124 and the second actuator pin 125 to move from the de-actuated positions to the actuated positions at actuation points located along the first ramp 126 and the second ramp 127 before an end of the first ramp 126 and the second ramp 127 (e.g., which causes the first actuator pin 124 and the second actuator pin 125 to actuate the wrap spring trigger 130 before the first actuator pin 124 and the second actuator pin 125 reach the end of the first ramp 126 and the second ramp 127). As the first actuator pin 124 and the second actuator pin 125 move beyond the actuation points, the first actuator pin 124 and the second actuator pin 125 may transmit the opposing force (e.g., to the second driven gear 114) causing the actuator assembly to translate in the direction of the opposing force (e.g., away from the flywheel 136).

In this manner, the first driven gear 112 may be physically separated from the flywheel 136 (e.g., by an air gap between the friction disk 122 and the flywheel 136, among other examples). As a result, reactionary torques generated based on the torque impulses may be mitigated (e.g., because the first driven gear 112 is physically separated from the flywheel 136, which delivers the rotational kinetic energy to the output anvil 140). In other words, the flywheel 136 and the output anvil 140 may be in a decoupled state (e.g., an isolated state or a floating state) whereby reactionary torque is absorbed by the flywheel 136 and/or the output anvil 140 (e.g., when the flywheel 136 and the output anvil 140 are in the decoupled state) and is not transmitted to one or more other components of the orthopedic rotary tool 101 (e.g., a housing of the orthopedic rotary tool 101). As a result, the user of the orthopedic rotary tool 101 does not experience reactionary torques.

In some implementations, after the first actuator pin 124 moves beyond the first ramp 126 and after the first end 125a of the second actuator pin 125 moves beyond the second ramp 127, the first actuator pin 124 and the second actuator pin 125 may move from the actuated positions to the de-actuated positions (e.g., because the first actuator pin 124 and the second actuator pin 125 are no longer transmitting the opposing force to the second driven gear 114 and based on the biasing force provided by the wrap spring trigger return spring 128). Because the opposing force is no longer being transmitted to the actuator assembly, the actuator assembly may transmit the normal force to the first driven gear 112 enabling the first driven gear 112 and/or the flywheel 136 to be driven and reaccumulate rotational energy.

Although the actuator elements are shown and described in connection with FIGS. 1A-1C as including two actuator pins (e.g., the first actuator pin 124 and the second actuator pin 125) and two ramps (e.g., the first ramp 126 and the second ramp 127), the actuator elements may include any suitable number of actuator pins and/or ramps (e.g., the actuator elements may include a single actuator pin configured to interact with a single corresponding ramp to actuate and de-actuate the wrap spring assembly or the actuator elements may include three or more actuator pins configured to interact with three or more corresponding ramps to actuate and de-actuate the wrap spring assembly, among other examples). As another example, the actuator elements may include multiple actuator element pairs configured to actuate and de-actuate the coupling mechanism at least one of redundantly or independently.

Additionally, although the actuator elements are shown and described in connection with FIGS. 1A-1C as including two actuator pins configured to interact with two corresponding ramps, the actuator elements may be any suitable actuator mechanisms configured to actuate and de-actuate the wrap spring assembly. For example, the actuator elements may include one or more mechanical contacts, one or more cams, one or more ramps, and/or one or more magnets.

As an example, a first set of magnets (e.g., a first set of magnets including a first arc magnet and a second arc magnet) may be provided on the first surface 114a of the second driven gear 114 (e.g., replacing the first ramp 126 and the second ramp 127) according to a first configuration (e.g., north poles of the arc magnets may be directed towards the first end 124a of the first actuator pin 124 and the first end 125a of the second actuator pin 125). A second set of magnets (e.g., including a first actuator pin magnet and a second actuator pin magnet) may be provided on the first end 124a of the first actuator pin 124 and on the first end 125a of the second actuator pin 125 according to a second configuration that matches the first configuration (e.g., north poles of the magnets provided on the first end 124a and the first end 125a may be directed toward the first arc magnet and the second arc magnet provided on the first surface 114a of the second driven gear 114).

In some implementations, the actuator elements may include non-contact or hybrid mechanisms that use magnetic, electromagnetic, pneumatic, and/or electromechanical forces to effect actuation, either in addition to, or instead of, the mechanical pins, ramps, and/or cams. For example, actuation may be accomplished using a synchronous magnetic coupling, a magnetorheological interface, and/or another controllable transmission mechanism configured to synchronize engagement of the wrap spring assembly (or another coupling mechanism) based on relative movement between rotary components, among other examples. In some implementations, such actuator mechanisms may be configured to actuate or de-actuate based on at least one of a torque, a position, a timing, and/or a sensor input, among other examples.

Accordingly, and in some implementations, rotation of the first driven gear 112 and the second driven gear 114 may cause non-physical interactions between the magnet provided on the first end 124a of the first actuator pin 124 and the first arc magnet and between the magnet provided on the first end 125a of the second actuator pin 125 and the second arc magnet where the opposing magnetic poles actuate the first actuator pin 124 and the second actuator pin 125 linearly (e.g., causing the first actuator pin 124 and the second actuator pin 125 to move from the de-actuated positions to the actuated positions before moving from the actuated positions to the de-actuated positions).

In some implementations, the sensor 142 may be configured to measure data indicative of one or more rotational parameters of the output anvil 140. For example, the one or more rotational parameters may include a rotational speed, a rotational position, a rotational direction, and/or an angular acceleration, among other examples In some implementations, the circuitry 144 may be configured to adjust, based on the data, one or more drive parameters associated with the drive system. For example, the one or more drive parameters may include a speed of the motor 102, a torque of the motor 102, a power supplied to the motor 102, a current supplied to the motor 102, and/or a voltage supplied to the motor 102, among other examples.

In some implementations, the circuitry 144 may be configured to maintain, based on the data, a rotational speed of the output anvil 140 within a range of approximately 50 rpm to approximately 500 rpm. As an example, the circuitry 144 may be configured to modulate, based on the data, the power supplied to the motor 102 to maintain the rotational speed of the output anvil 140 at a desired speed (e.g., in the range of approximately 50 rpm to approximately 500 rpm). Although the desired speed is described as being in a range of approximately 50 rpm to approximately 500 rpm, the desired speed may be any suitable speed.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
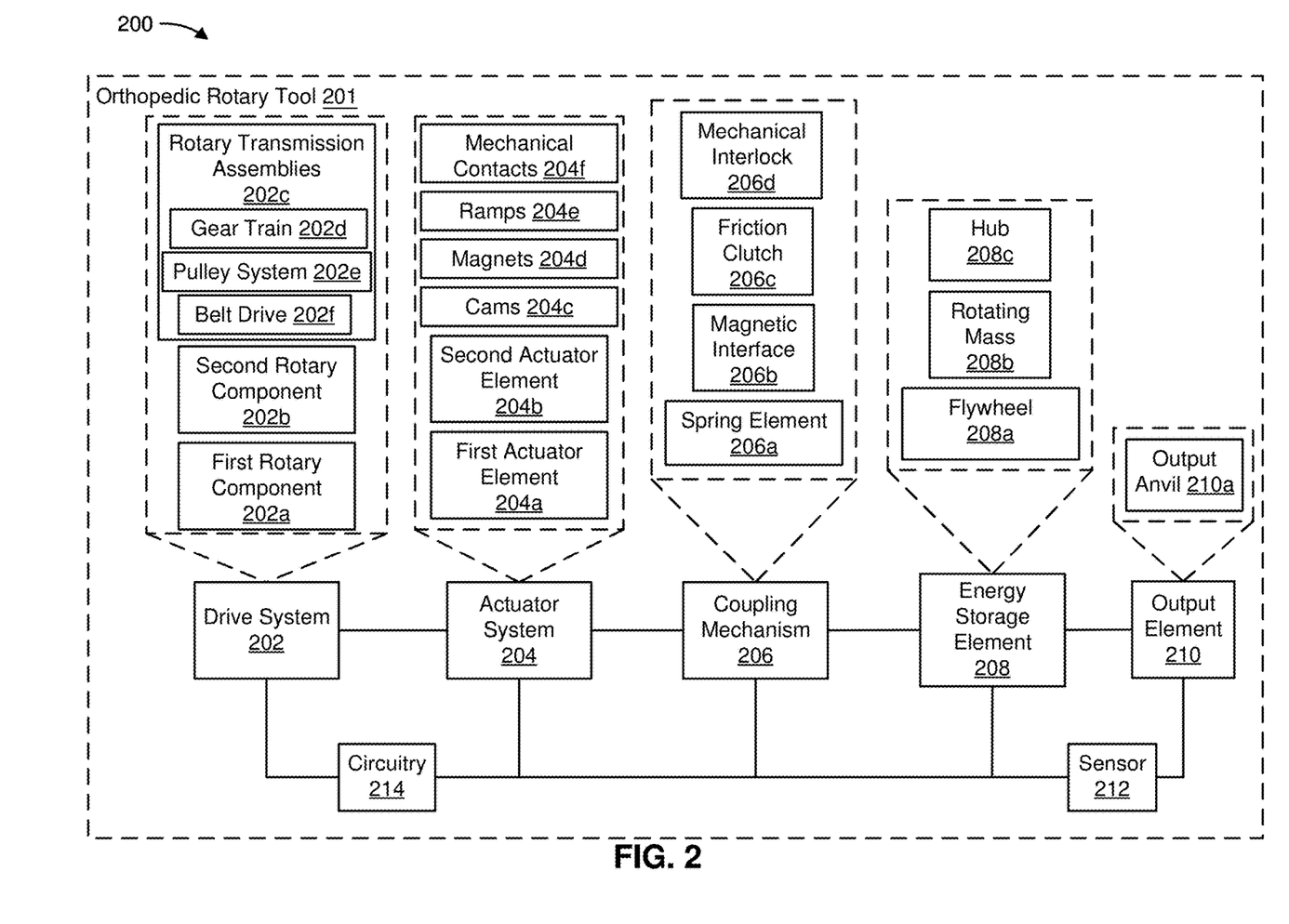
FIG. 2 is a diagram of an example orthopedic rotary tool.

FIG. 2 is a diagram of an example associated with transmitting torque impulses via an orthopedic rotary tool (e.g., shown as an orthopedic rotary tool 201). As shown in FIG. 2, the orthopedic rotary tool 201 may include a drive system 202, an actuator system 204, a coupling mechanism 206, an energy storage element 208, an output element 210 (e.g., shown as including an output anvil 210a in FIG. 2), a sensor 212, and circuitry 214.

In some implementations, the drive system 202 may include a first rotary component 202a (e.g., which may correspond to the first driven gear 112) and a second rotary component 202b (e.g., which may correspond to the second driven gear 114). The first rotary component 202a may be configured to impart rotation to the energy storage element 208.

In some implementations, the actuator system 204 may include at least a first actuator element 204a (e.g., which may correspond to the first actuator pin 124 and/or the second actuator pin 125) disposed on the first rotary component 202a and a second actuator element 204b (e.g., which may correspond the first ramp 126 and/or the second ramp 127) disposed on the second rotary component 202b.

In some implementations, the coupling mechanism 206 may be operable between coupled states and decoupled states. For example, and during operation of the orthopedic rotary tool 201, the energy storage element 208 may accumulate rotational energy (e.g., via the drive system), relative rotation between the first rotary component 202a and the second rotary component 202b may cause interactions between the first actuator element 204a and the second actuator element 204b, and interactions may transition the coupling mechanism 206 between the coupled states and the decoupled states. When the coupling mechanism 206 is in the coupled states, the energy storage element 208 may be in communication (e.g., mechanical communication) with the output element 210 and configured to deliver a torque impulse to the output element 210. When the coupling mechanism 206 is in the decoupled states, the energy storage element 208 may not be in communication (e.g., mechanical communication) with the output element 210.

In some implementations, the coupling mechanism 206 may be configured to selectively engage the energy storage element 208 with the output element 210. The coupling mechanism 206 may be configured to be actuated and de-actuated based on at least one of physical interactions or non-physical interactions (e.g., magnetic interactions) between the first actuator element 204a and the second actuator element 204b resulting from relative rotation of the first rotary component 202a and the second rotary component 202b. In some implementations, actuation of the coupling mechanism 206 may cause engagement of the energy storage element 208 with the output element 210 to deliver a torque impulse to the output element 210, and disengagement of the energy storage element 208 from the drive system 202 to limit reactionary torque. In some implementations, the actuator system may include multiple actuator element pairs configured to actuate and de-actuate the coupling mechanism 206 at least one of redundantly or independently.

In some implementations, the wherein the energy storage element 208 may include at least one of a flywheel 208a (e.g., coupled to a flywheel hub), a rotating mass 208b, and/or a hub 208c (e.g., a flywheel hub and/or a rotating mass hub, among other examples). In some implementations, the first actuator element 204a and/or the second actuator element 204b may include one or more cams 204c, magnets 204d, ramps 204e, and/or mechanical contacts 204f, among other examples.

In some implementations, the coupling mechanism 206 may include at least one of a spring element 206a (e.g., a wrap spring assembly or a torsion spring configured to engage rotating components), a magnetic interface 206b (e.g., a permanent magnet clutch or an electromagnetic clutch configured to selectively couple rotary elements), a friction clutch 206c (e.g., a disc clutch, a cone clutch, or multi-plate clutch configured to transmit torque through surface friction), and/or a mechanical interlock 206d (e.g., a dog clutch or a spline engagement configured to mechanically lock rotating components together), among other examples.

In some implementations, the first rotary component 202a and the second rotary component 202b may be configured to rotate at different rotational speeds. In some implementations, a difference in the different rotational speeds may be at least sufficient to cause periodic alignment of the first actuator element and the second actuator element.

In some implementations, the circuitry 214 may be configured to regulate power supplied to the drive system 202 based on a rotational speed of the output element 210. In some implementations, the actuator system may be configured to induce at least one of axial movement or radial movement of at least one of the first actuator element 204a or the second actuator element 204b. In some implementations, the drive system 202 may further include an interface element (e.g., which may correspond to the friction disk 122) configured to selectively couple the drive system 202 (e.g., the first rotary component 202a) to the energy storage element 208 and decouple the drive system 202 (e.g., the first rotary component 202a) from the energy storage element 208 (e.g., upon reaching a torque threshold).

In some implementations, the drive system 202 may include one or more rotary transmission assemblies 202c (e.g., shown as including at least one of a gear train 202d, a pulley system 202e, and/or a belt drive 202f in FIG. 2) among other examples.

In some implementations, the coupling mechanism 206 may be configured to cause the energy storage element 208 to deliver torque impulses at a frequency of up to approximately 50 hertz. Each torque impulse may have a duration of less than approximately 50 milliseconds.

In some implementations, the energy storage element 208 may be decoupled from the output element (e.g., based on the coupling mechanism being in the decoupled states). In some implementations, the drive system 202 may be configured to be decoupled from the output element 210 during at least a portion of a time in which the torque impulse is delivered to the output element 210.

In some implementations, the sensor 212 may be configured to measure data indicative of one or more rotational parameters of the output element 210. In some implementations, the circuitry 214 may be configured to adjust, based on the data, one or more drive parameters associated with the drive system 202. For example, the circuitry 214 may be configured to maintain, based on the data, a rotational speed of the output element 210 in a range of approximately 50 rpm and approximately 500 rpm.

In some implementations, the energy storage element 208 may be configured to be decoupled from the drive system 202 (e.g., the first rotary component 202a) during coupling to the output element 210, and to be recoupled to the drive system 202 (e.g., the first rotary component 202a) following decoupling from the output element 210. In some implementations, the energy storage element 208 may include a hub (e.g., which may correspond to the flywheel hub 138). In some implementations, the coupling mechanism 206 may include a wrap spring assembly (e.g., which may correspond to the wrap spring assembly including the wrap spring trigger return spring 128, the wrap spring trigger 130, the wrap spring clip 132, and the wrap spring 134) configured to engage the hub and deliver the torque impulse to the output element 210.

Although the orthopedic rotary tool 201 of FIG. 2 is described as including the components shown and described in connection with FIG. 2, the orthopedic rotary tool 201 may include any suitable components. Additionally, or alternatively, one or more components of the orthopedic rotary tool 201 may correspond to one or more components of the orthopedic rotary tool 101. Accordingly, and in some implementations, one or more components of the orthopedic rotary tool 101 and/or the orthopedic rotary tool 201 may be used to perform one or more operations, functions, and/or processes as described in more detail elsewhere herein.

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Accordingly, some implementations described herein provide an orthopedic rotary tool capable of using a mechanical mechanism (e.g., rather than, or in addition to, an electronically-controlled mechanism) for transmitting torque impulses to an output element, as described in more detail elsewhere herein. The use of a mechanical mechanism (e.g., as opposed to an electronically controlled mechanism) may provide benefits, such as mechanical simplicity, enhanced durability, quicker actuation response, increased reliability, reduced maintenance requirements, improved environmental robustness, and greater torque transmission capability.

Additionally, the circuitry (e.g., the circuitry 144 and/or the circuitry 214) may include processing circuitry, such as general-purpose processors, special-purpose processors, integrated circuits (ICs), and/or combinations thereof, configured or programmed to perform one or more operations and/or processes described herein. A processor is a type of processing circuitry, as it includes transistors and other physical circuit components. A processor may execute instructions stored in a memory, thereby operating as a programmed processor. In this disclosure, the term "circuitry" may refer to hardware that performs, or is programmed to perform, the operations and/or processes described herein. Such hardware may include any disclosed hardware or other known hardware that is configured or programmed to execute the operations and/or processes described herein. When the hardware includes a processor, which is a type of circuitry, the circuitry may refer to a combination of hardware and software, where the software configures the hardware and/or processor to perform the operations and/or processes described herein.

When an element is referred to herein as being "operatively coupled" to another element, it should be understood that the elements may interact and/or cooperate with one another in any suitable manner, such as to facilitate the performance of a function, an action, and/or an operation (e.g., either by one or both of the elements and/or by causing another element to perform the function, the action, and/or the operation, among other examples). For example, one or more elements may be connected and/or coupled to one another, with or without intervening elements, to enable the performance of the function, the action, and/or the operation.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and the drawings are accordingly to be regarded in an illustrative rather than restrictive sense.

What is claimed is:

1. An orthopedic rotary tool, comprising:
an energy storage element configured to accumulate rotational energy;
a drive system including a first rotary component and a second rotary component,
wherein the first rotary component is configured to impart rotation to the energy storage element;
an actuator system including at least a first actuator element disposed on the first rotary component and a second actuator element disposed on the second rotary component;
a coupling mechanism operable between coupled states and decoupled states; and
an output element;
wherein, during operation of the orthopedic rotary tool:
the energy storage element accumulates the rotational energy via the drive system,
relative rotation between the first rotary component and the second rotary component causes interactions between the first actuator element and the second actuator element,
the interactions transitioning the coupling mechanism between the coupled states and the decoupled states, and
when the coupling mechanism is in a coupled state, the energy storage element is configured to deliver a torque impulse to the output element.

2. The orthopedic rotary tool of claim 1, wherein the energy storage element includes at least one of a rotating mass or a flywheel.

3. The orthopedic rotary tool of claim 1, wherein the first actuator element and the second actuator element include at least one of:
mechanical contacts,
cams,
ramps, or
magnets.

4. The orthopedic rotary tool of claim 1, wherein the coupling mechanism includes at least one of:
a spring element,
a magnetic interface,
a friction clutch, or
a mechanical interlock.

5. The orthopedic rotary tool of claim 1, wherein the first rotary component and the second rotary component are configured to rotate at different rotational speeds.

6. The orthopedic rotary tool of claim 5, wherein a difference in the different rotational speeds is at least sufficient to cause periodic alignment of the first actuator element and the second actuator element.

7. The orthopedic rotary tool of claim 1, wherein the actuator system is configured to induce at least one of axial movement or radial movement of at least one of the first actuator element or the second actuator element.

8. The orthopedic rotary tool of claim 1, further comprising:
an interface element configured to:
selectively couple the drive system to the energy storage element, and
decouple the drive system from the energy storage element upon reaching a torque threshold.

9. The orthopedic rotary tool of claim 1, wherein the drive system includes one or more rotary transmission assemblies, and
wherein the one or more rotary transmission assemblies include at least one of:
one or more gear trains,
one or more pulley systems, or
one or more belt drives.

10. The orthopedic rotary tool of claim 1, wherein the coupling mechanism is configured to cause the energy storage element to deliver torque impulses at a frequency of up to approximately 50 hertz, and
wherein each torque impulse has a duration of less than approximately 50 milliseconds.

11. The orthopedic rotary tool of claim 1, wherein, based on the coupling mechanism being in a decoupled state, the energy storage element is decoupled from the output element.

12. The orthopedic rotary tool of claim 1, wherein the drive system is configured to be decoupled from the output element during at least a portion of a time in which the torque impulse is delivered to the output element.

13. The orthopedic rotary tool of claim 1, further comprising:
a sensor configured to measure data indicative of one or more rotational parameters of the output element.

14. The orthopedic rotary tool of claim 13, further comprising:
circuitry configured to adjust, based on the data, one or more drive parameters associated with the drive system.

15. The orthopedic rotary tool of claim 13, further comprising:
circuitry configured to maintain, based on the data, a rotational speed of the output element in a range of approximately 50 rpm and approximately 500 rpm.

16. The orthopedic rotary tool of claim 1, wherein the energy storage element is configured to be decoupled from the drive system during at least a portion of a time in which the energy storage element is coupled to the output element, and to be recoupled to the drive system following decoupling from the output element.

17. The orthopedic rotary tool of claim 1, wherein the energy storage element includes a hub, and
wherein the coupling mechanism includes a wrap spring assembly configured to engage the hub and deliver the torque impulse to the output element.

18. An orthopedic rotary tool, comprising:
an energy storage element configured to accumulate rotational energy;
a drive system including a rotary component;
an actuator system including actuator elements,
wherein at least one actuator element is disposed on the rotary component;
an output element; and
a coupling mechanism configured to selectively engage the energy storage element with the output element,
wherein the coupling mechanism is configured to be actuated and de-actuated based on at least one of physical interactions or non-physical interactions between the at least one actuator element and at least one different actuator element based on rotation of the rotary component, and
wherein actuation of the coupling mechanism causes:
engagement of the energy storage element with the output element to deliver a torque impulse to the output element, and
disengagement of the energy storage element from the drive system to limit reactionary torque.

19. The orthopedic rotary tool of claim 18, wherein the at least one actuator element includes multiple actuator elements disposed on the rotary component,
wherein the at least one different actuator element includes multiple different actuator elements, and
wherein the multiple actuator elements and the multiple different actuator elements are configured to actuate and de-actuate the coupling mechanism at least one of redundantly or independently.

20. An orthopedic rotary tool, comprising:
an energy storage element configured to accumulate rotational energy;
an actuator system including actuator elements;
a coupling mechanism operable between a coupled state and a decoupled state;
an output element; and
a drive system configured to:
impart rotation to the energy storage element, and
cause rotational movement of at least one actuator element resulting in an interaction between the at least one actuator element and a different actuator element,
wherein the interaction causes the coupling mechanism to transition between the coupled state and the decoupled state, and in the coupled state, the coupling mechanism enables the energy storage element to deliver a torque impulse to the output element.

* * * * *